United States Patent [19]
Zvolanek

[11] Patent Number: 5,518,079
[45] Date of Patent: May 21, 1996

[54] LAWN MOWER

[75] Inventor: Terry L. Zvolanek, Blue Springs, Nebr.

[73] Assignee: F. D. Kees Manufacturing, Co., Beatrice, Nebr.

[21] Appl. No.: 357,662

[22] Filed: Dec. 16, 1994

[51] Int. Cl.$^6$ .......................... A01D 34/68; B62D 11/04
[52] U.S. Cl. .................. 180/19.1; 56/10.8; 56/11.1; 180/6.32; 180/6.48; 180/19.2; 180/19.3; 180/252
[58] Field of Search ................. 180/6.32, 6.48, 180/19.1, 19.2, 19.3, 252; 56/11.1, 10.8

[56] References Cited

U.S. PATENT DOCUMENTS

| | | | |
|---|---|---|---|
| 5,077,959 | 1/1992 | Wenzel | 56/11.1 |
| 5,127,215 | 7/1992 | Wenzel | 56/11.1 |
| 5,137,100 | 8/1992 | Scott et al. | 180/6.48 |

Primary Examiner—Mitchell J. Hill
Attorney, Agent, or Firm—Vincent L. Carney

[57] ABSTRACT

To control the speed of a lawn mower, the speed of the lawn mower is changed in a forward direction along a longitudinal plane, resulting in a tendency to turn because of different speed characteristics of the right and left wheel drives. The speed is corrected by lateral movement of a control lever to increase the speed of one wheel motor and decrease the speed of the other wheel motor. When turning, if the lawn mower is not aligned along the longitudinal axis after the turn, the deviation is indicated in the position of the control lever to the right or left. This can be corrected by momentarily applying a motor speed change to one of said right and left hydraulic motors while observing the control lever until the control lever is centered in the longitudinal plane, whereby the speed of the lawn mower will be aligned along the longitudinal plane.

12 Claims, 4 Drawing Sheets

LAWN MOWER

BACKGROUND OF THE INVENTION

This invention relates to hydraulic lawn mowers and more particularly to the control of hydraulically driven lawn mowers.

In one class of hydraulic lawn mower, a right hydraulic pump drives a right hydraulic motor to rotate a right wheel and a left hydraulic pump drives a left hydraulic motor to drive a left wheel. The mower is driven in a forward direction by driving both hydraulic motors at the same speed. The pumping speed of the hydraulic pumps is controlled by the operator through one or more levers, such as a ground speed lever.

This class of hydraulically driven lawn mowers includes a mechanism for avoiding unintended turning of the lawn mower when the forward speed is changed. The tendency to turn when the forward speed is changed occurs because the right and left hydraulic pumps, hydraulic motors and linkages connecting them to each other and to the ground speed lever have different speed characteristics. These different speed characteristics result in a different change in the speed of the right and left wheels with respect to each other when the ground speed lever is moved to change the forward speed of the mower.

Because a change in the ground speed lever affects the speeds of the right and left wheels differently under some circumstances, a change of the ground speed lever controlling the speeds of both the right and the left wheels results in a greater increase in speed of one wheel than in the other wheel. In some such hydraulically controlled lawn mowers, the same speed control lever that is used to change forward motion can turn the lawn mower. In this class of lawn mower, the speed control lever: (1) simultaneously changes the speed of the wheels in the forward direction or in the reverse direction by substantially the same amount when the lever is moved along a straight path in a longitudinal plane that corresponds to the forward direction of the mower; and (2) selectively changes the speed of the two motors with respect to each other by movement of the speed control lever at an angle to the longitudinal plane. Thus, the operator may control unintended turning from the speed control lever.

In one prior art apparatus for correcting the unintended change in direction of the lawn mower in the class of lawn mowers having a single speed control lever that changes the speed of both wheels by substantially the same amount when moved in a longitudinal plane and changes the speed of the right and left wheels with respect to each other when moved in a direction transverse to the longitudinal direction, the tendency to unintentionally turn is corrected from the single speed control lever but the speed control lever can turn the lawn mower by large amounts and is used to steer the lawn mower. In other prior art lawn mowers, correction against turning is made only by separate speed control levers which individually control the oil pressure from the right pump or the left pump.

The prior art hydraulic lawn mowers have several disadvantages, such as for example: (1) it is difficult to avoid unintended turning; and (2) there is an increased tendency to turn by an excessive amount, thus creating under some circumstances, a hazard.

SUMMARY OF THE INVENTION

Accordingly, it is an object of the invention to provide a novel hydraulic lawn mower.

It is a further object of the invention to provide a novel control system for a hydraulically driven lawn mower.

It is a still further object of the invention to provide a novel speed control mechanism for a hydraulically driven lawn mower.

It is a still further object of the invention to provide a novel steering mechanism for a hydraulically driven lawn mower.

It is a still further object of the invention to provide a novel method and apparatus for readily adjusting against the tendency of a hydraulically driven lawn mower to turn during changes in speed.

In accordance with the above and further objects of the invention, a control system for hydraulically driven lawn mower includes right and left hydraulic pumps, right and left hydraulic wheel motors, a ground speed control lever that alters the pumping rate of the hydraulic pumps when moved, and right and left hydraulic pump control levers for individually changing the pumping rate of respective ones of the right and left hydraulic pumps.

The ground speed control lever increases the pumping rate of both hydraulic pumps or decreases their pumping rate substantially equally when it is moved along the longitudinal plane. The longitudinal plane is a flat linear plane that extends in the direction of movement of the lawn mower. It may be within or may be parallel to the central longitudinal plane of the lawn mower, which central longitudinal plane is equally spaced between both wheels. When the ground speed lever is moved at an angle to the longitudinal plane, it increases the pumping rate of one of the right and left hydraulic pumps and decreases the pumping rate of the other, depending on whether the direction of movement is to the right or the left with respect to the longitudinal plane.

The amount of movement at an angle to the plane extending in the direction of motion of the lawn mower is limited by a slot near or at the pivot point of the speed control lever. The width of the slot extends at an angle to the longitudinal plane of the lawn mower and has a length centered on the line of movement of the lever within the longitudinal plane to permit an angular movement along the lateral slot that is within a preset range of angular movement. The range of the ratios of angular pivoting motion in the transverse direction to angular pivital motion in the longitudinal direction is between a ratio of 1 to 90 and a ratio of 1 to 3. Preferably, the angular motion in the transverse direction is between one degree and 1.3 degrees but should not be greater than 5 degrees. The angular motion may cause a reduction in the speed of one of the right and left wheels and an increase in the speed of the other of the right and left wheels approximately in the range of 2.5 to 5.5 percent.

The angular motion of this lever is intended to permit a change of direction or turning of the lawn mower by changing the speed of the pumping by an amount within the range of 2 degrees of turning for 10 feet of forward motion to 10 degrees of turning of the lawn mower for 10 feet of forward motion. This control is intended to permit centering of the movement of the mower along the longitudinal plane using the speed lever directly when the change in direction is caused by a difference in the speed characteristics of the right and left hydraulic pumps, hydraulic motors and linkages connecting them to each other and to the ground speed control lever.

In operation, the ground speed and the direction of movement of a hydraulic lawn mower is controlled from a control panel by an operator behind the control panel. The operator can manipulate a ground speed control lever that controls the rate of rotation of the right and the left wheels, a right speed control lever that decreases the speed of the right wheel to cause the lawn mower to turn right and a left speed control lever that decreases the speed of the left wheel to cause the lawn mower to turn left.

During normal operation, the operator moves the ground control lever along the longitudinal plane to increase or decrease the forward speed of the lawn mower. When turning, the operator may actuate individual right and left speed control levers to change the rotational rate of the right and left wheels. When increasing or decreasing the speed of the lawn mower in a forward direction, there is a tendency for the wheels to rotate at slightly different rates because of different speed characteristics of the right and left drives for the wheels. The operator compensates for this tendency with the ground control lever which may pivot in a direction transverse to the longitudinal plane. When pivoted in a direction transverse to the longitudinal plane, the speed of one wheel is increased and the speed of the other is decreased.

To accomplish this result, the ground speed control lever is mounted to a pivotal yoke or gymbal having two degrees of freedom of motion. The movement of the control lever is limited to a predetermined angular motion along the longitudinal plane and to a much smaller angular motion in the transverse direction. When the gymbal pivots in the longitudinal plane, it changes the pumping rate of both the right and the left hydraulic pumps by the same amount, and when it pivots to the right or left with respect to the longitudinal plane, it decreases the speed of one hydraulic pump and increases the speed of the other.

When the lever is pivoted along the longitudinal plane toward its front end, the speed of both hydraulic pumps is increased by substantially the same amount and when pulled backward along the longitudinal plane of the lawn mower, the speed is decreased. When pivoted to the right in a direction at an angle to the longitudinal plane, the pumping speed of the left hydraulic pump is decreased and the speed of the right hydraulic pump is increased. Similarly, when the speed control lever is pivoted at an angle to the longitudinal plane and to the left, the speed of the right hydraulic pump is decreased and the speed of the left hydraulic pump is increased.

The gymbal controls the speed of the wheels by pressing spring biased linkages that control the pumping speed of the right and left hydraulic pumps. The range of motion of the pivoting is limited by a slot in which the ground speed control lever moves. This slot may be narrowed to reduce the range by which speed differential between the wheels can be achieved by the ground speed control lever. For example, when the ground speed control lever is in neutral, the slot has the same width as the ground speed control lever so that neither pump can cause creep.

The slot or other indications of the direction of the longitudinal plane direction are visible adjacent to the ground speed control lever and the ground speed control lever is biased to a center position in the slot. Because the speed of the motors are changed with a shorter motion of the ground speed control lever than with the right or left speed control levers, the operator can readily see if both hydraulic pumps are providing equal speed to the hydraulic motors with precision, and if not, the appropriate one of the right and left speed control levers can be carefully actuated to correct the speed of the hydraulic pumps. Thus, after making a turn with the right or left control levers, it can readily be determined if the lawn mower is adjusted for straight motion, and if not, it is sufficient to merely momentarily utilize the individual speed control mechanisms for the right or the left wheels to center the ground speed control lever in the slot, under which circumstance the speed of the wheels is adjusted for straight motion of the lawn mower.

From the above description, it can be understood that the hydraulically driven lawn mower of this invention has several advantages, such as for example: (1) it is relatively easy to correct for unintentional turning tendencies when the speed of the lawn mower is increased or decreased; and (2) the direction of turning is constrained to avoid the risk of an excessive overcorrection that could cause some damage.

DESCRIPTION OF THE DRAWINGS

The above noted and other features of the invention will be better understood from the following detailed description when considered with reference to the accompanying drawings, in which.

DETAILED DESCRIPTION

Figure 1:
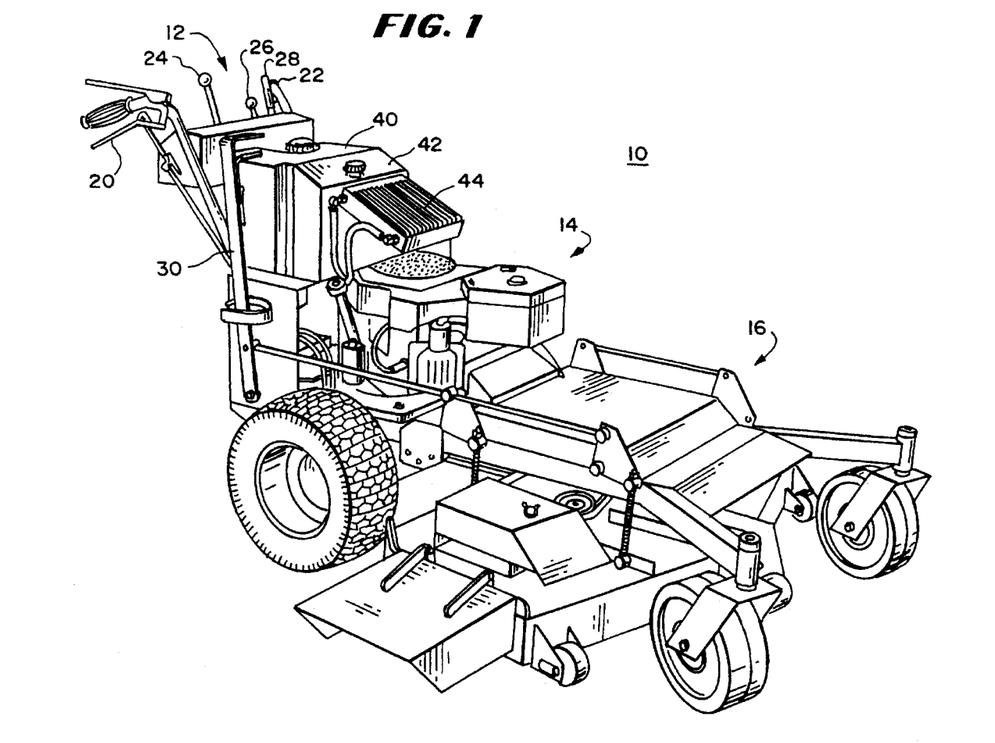
FIG. 1 is a perspective view of a lawn mower in accordance with an embodiment of the invention.

In FIG. 1, there is shown a simplified perspective view of a hydraulically driven lawn mower 10 having an operation control section 12, a power section 14 and a drive and cutting section 16. In using the lawn mower 10, the operator walks or rides behind the lawn mower 10 and operates controls in the control section 12 which controls the power section 14 and the drive section 16 so that the operator may control the speed in the forward or reverse direction and control turning of the lawn mower 10. When changing the speed in the forward direction, the operator may simply and efficiently, from the speed control lever, prevent unintentional turning by correcting for the different speed characteristics of the drive systems for the right and left wheels.

The operator control section 12 includes a right-hand steering lever 20, a left-hand steering lever 22, a throttle control lever 26, a blade engagement lever 28, a deck height adjustment lever 30 and a ground speed control lever 24. The controls themself perform conventional operations and are self-explanatory except that the ground speed control lever 24, the right-hand steering lever 20 and the left-hand steering lever 22 cooperate with a mechanism that efficiently and easily corrects for the tendency of hydraulically driven lawn mowers to unintentionally turn when their speed is changed or when a turn is made.

The power section 14 includes a fuel tank 40, a hydraulic reservoir 42 and the hydraulic cooler 44 among other components to be described hereinafter. These components are substantially conventional and are not part of the invention in themselves except to the extent that they cooperate in a conventional manner with the speed control section 12.

The drive and cutting section 16 includes the front and rear tires, the hood, the discharge chute, the right belt shield, the mowing deck and the cutters all of which are conventional except for the manner in which they cooperate with the control section 12 in a mowing operation.

Figure 2:
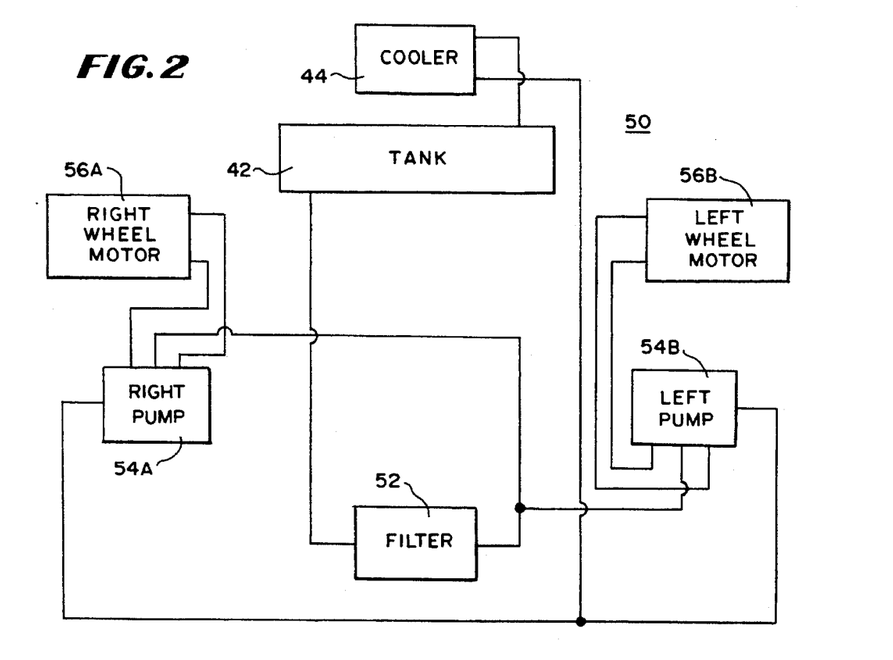
FIG. 2 is a schematic block diagram of a hydraulic system suitable for use in the embodiment of FIG. 1.

In FIG. 2, there is shown a schematic block diagram of a hydraulic system useful in the embodiment of FIG. 1 including a reservoir tank 42, a cooler 44, right and left wheel motors 56A and 56B respectively, right and left hydraulic pumps 54A and 54B respectively and a filter 52. As shown in FIG. 2, the right and left pumps 54A and 54B each supply fluid under pressure to respective ones of the right and left wheel motors 56A and 56B that drive the wheels. Thus, the speed of pumping of the right and left pumps 54A and 54B determine the speed of rotation of the respective right and left wheels of the lawn mower. Liquid is supplied to the pumps 54A and 54B from the tank 42, which liquid passes through the filter 52 before going to the pumps 54A and 54B. Bypass or leakage oil from the right and left motors 56A and 56B drains into a cooler 44 to remove heat and from there to the tank 42.

Figure 3:
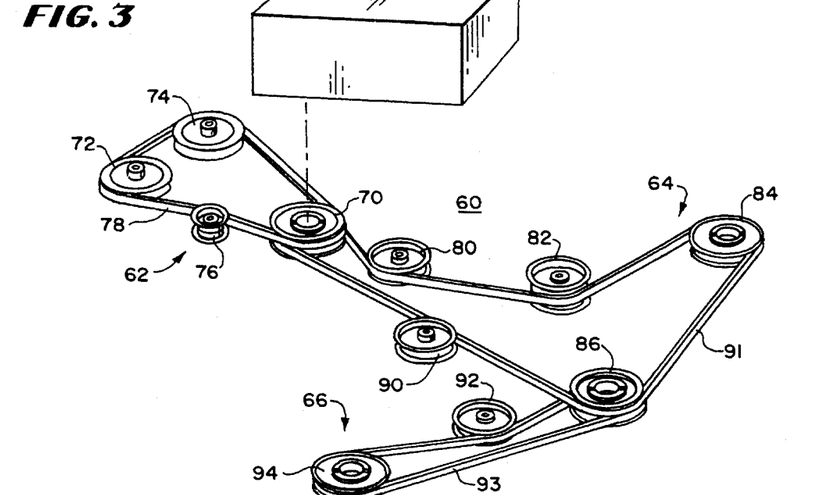
FIG. 3 is a simplified, fragmentary perspective drawing showing a belt drive system useful in the embodiment of the invention of FIGS. 1 and 2.

In FIG. 3, there is shown a belt drive system 60 including the engine 68 which may be any conventional motor such as an internal combustion gasoline engine, the pump belt system 62, the cutter belt system 64 and an auxiliary cutter belt system 66. The engine 68 drives a double belt pulley 70 which in turn drives the pump belt system 62, the cutter belt system 64 and the auxiliary cutter belt system 66.

The pump belt system 62 includes the driven double belt pulley 70, a right pump drive pulley 72, a left pump drive pulley 74 and an idler pulley 76. These are all connected by a single belt 78 to the double belt pulley 70. The cutter belt system 64 includes an idler pulley 80, an idler pulley 82, a blade rotor pulley 84, a double belt transfer pulley 86 and an idler pulley 90. All of these are connected by a single belt 91 to the double belt drive pulley 70 to drive the cutter blade of the lawn mower through the blade rotor pulley 84 and to drive the double belt transfer pulley 86.

The auxilary cutter system 66 includes the double belt pulley 86, an idler pulley 92 and an auxilary cutter blade pulley 94 all connected by a single belt 93 to be driven by the double belt transfer pulley 86 so that the cutters both rotate in synchronism under the control of the engine 68. The pumps 54A and 54B (FIG. 2) are also driven by the engine 68 and have applied to them the same rotational velocity so that their speed is controlled by control valves controlling the amount of bleeding from the hydraulic pumps.

Figure 4:
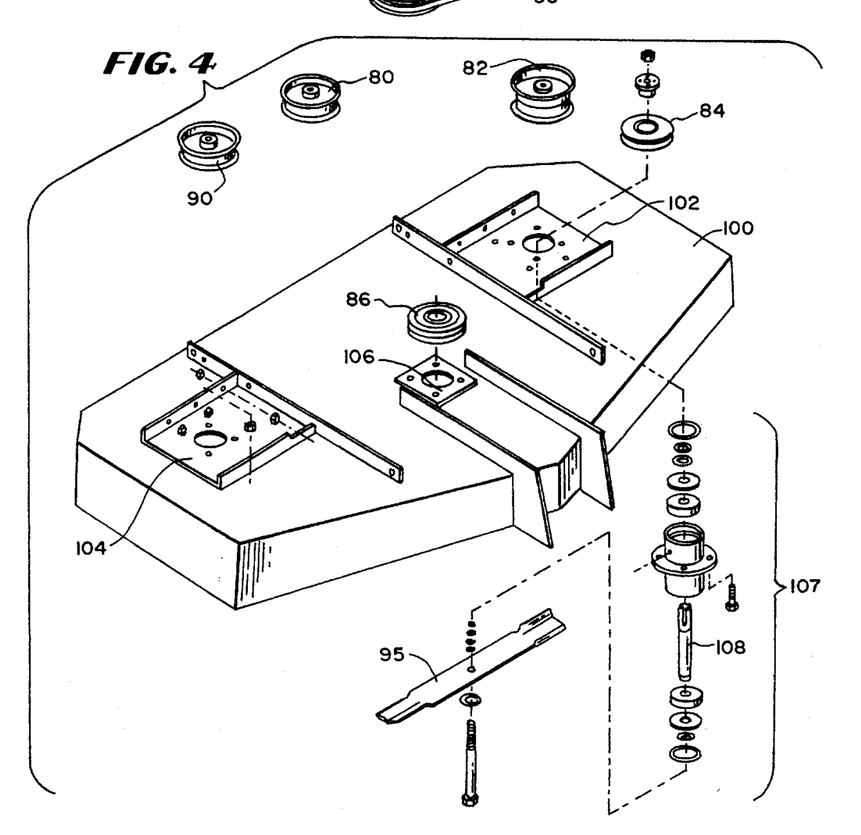
FIG. 4 is a simplified, fragmentary, partly exploded perspective view showing the manner in which the belt drive cooperates with the cutting blades of the lawn mower of FIG. 1.

In FIG. 4, there is shown a simplified, fragmentary exploded perspective view of the drive and cutting system 16 for the cutter blades, one of which is shown schematically at 95. This drive and cutting system 16 includes the lawn mower deck 100, a mounting fixture 102 for the blade rotor pulley 84 and a corresponding mounting 104 for the auxilary cutter pulley 94 (FIG. 3), a mounting fixture 106 for the double belt transfer pulley 86 and a spindle assembly 107. The cutter blades, engine and drive mechanism for the cutters are conventional and not part of the invention.

The idler pulleys 80, 82 and 90 cooperate with the blade rotor pulley 84 which is mounted to the fixture 102 to receive the spindle assembly 107. The spindle assembly 107 includes a spindle 108 mounted in a collar as shown and connected to receive the drive belt at a location above the deck 100 in the fixture 102. The blade 95 is mounted to the lower end of the spindle 108 as shown to perform cutting operations.

Figure 5:
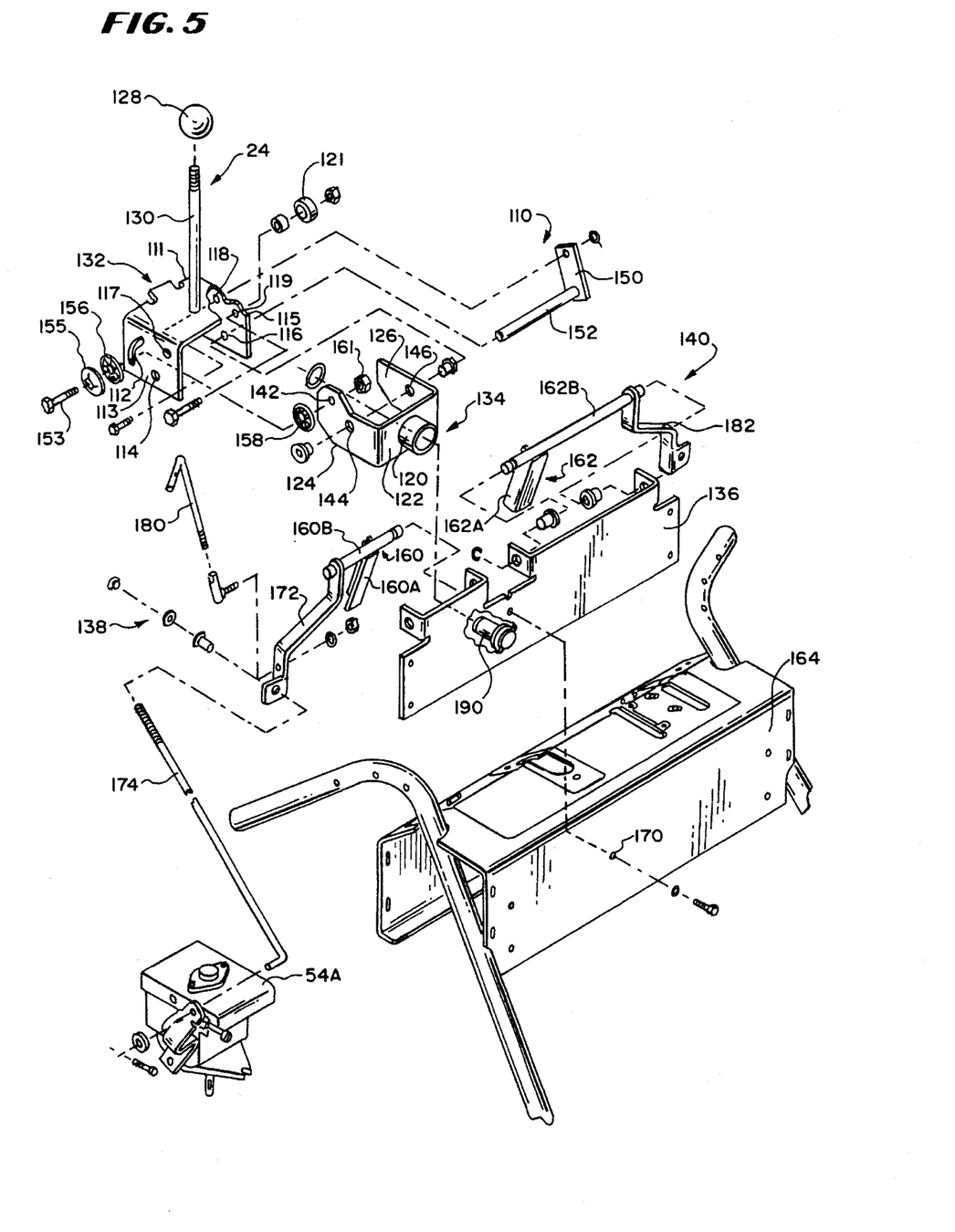
FIG. 5 is a simplified, fragmentary, partly exploded perspective view showing the speed control connection between the speed control lever and the hydraulic pumps and the manner in which the individual wheel control means is connected to the individual hydraulic pumps.

In FIG. 5, there is shown a simplified, fragmentary, exploded perspective view of a portion of the speed control system 12 having the ground speed control lever 24, a right wheel speed control linkage 138 and a left wheel speed control linkage 140. The speed control lever 24 includes a knob 128, a control lever stick 130, a control lever yoke 132, a control lever bracket 134 and a control lever axle 110. The control lever yoke 132 includes rollers to be described hereinafter that press against the spring biased right wheel speed control linkage 138 and spring biased left wheel speed control linkage 140 to control forward speed and to correct for unintentional turning during speed changes of the lawn mower.

The control lever yoke 132 includes an upper base 111, and first and second downwardly extending parallel ears, 113 and 115. The upper base 111 is mounted at its upper surface to the bottom of the speed control stick 130 to be pivoted therewith. The knob 128 is mounted to the top of the control stick 130.

The downwardly extending ears 113 and 115 include a curved path control opening or slot 112, a first opening 114, a second opening 116, a third opening 117, a fourth opening 119 and corresponding rollers, one of which is shown at 121 mounted to the fourth opening 119, the other roller being omitted from the drawing for clarity. The other roller is mounted to the third opening 117. The first and second openings 114 and 116 are aligned with each other and the third and fourth openings 117 and 119 are aligned with each other.

The rollers move with the control lever yoke 132 as it is pivoted by the ground control lever 24 and actuate the left and right speed control linkages 138 and 140 in a manner to be described hereinafter. If the control lever yoke 132 is tilted because the ground speed control lever 24 has been pivoted at an angle to the longitudinal plane, the lower of the two rollers will decrease the speed of its corresponding hydraulic pump and the higher roller will permit the spring biased arm in one of the right or left wheel speed control linkages 138 or 140.

The control lever bracket 134 includes a central collar 120, a central surface 122 and two side ears 124 and 126. The ears 124 and 126 extend from opposite sides of the surface 122 and the collar 120 extends outwardly from the central surface 122. The ear 124 includes a first opening 142 and a second opening 144 and the ear 126 includes an opening 146 aligned with the opening 144. The ears 124 and 126 fit within the two sides of the control lever yoke 132. They are held together by the control lever axle 110 which includes a base plate 150, an elongated cylindrical axle 152 and an opening 154.

The axle 152 extends from a first side of the base plate 150 at one end and the base plate 150 includes an opening 154 through it at the other end. The axle 152 passes through the openings 116, 146, 144 and 114 to pivotably hold the control lever bracket 134 within the downwardly extending ears of the control lever yoke. The opening 154 is fastened in an aligned location to the opening 118 in the downwardly extending member of the yoke 132. The opening 142 in the ear 124 is aligned with the slot 112 and fastened in place by a capscrew 152, washer 154, friction nut 156, friction nut 158, and nut 161 so that it moves within the slot 112 as it pivots about the axle 152 in response to motion of the lever stick 130, but remains in place because of the friction provided by the friction nut members 156 and 158 which grip the ear 113 of the control lever yoke 132 and the ear 124 of the control lever bracket 134.

With this arrangement, the speed control lever 24 is held in place unless manually moved by an operator and when moved causes a corresponding motion in the right and left wheel speed control linkages 138 and 140 in a manner to be described hereinafter. The motion of the ground speed control lever 24 may be in the longitudinal plane or transverse to the longitudinal plane or both. When it is transverse to the longitudinal plane, the control lever yoke 132 and the control lever bracket 134 pivot about the rotatable member 190 that extends from the collar 120 of the control lever bracket 134. When it is in the longitudinal plane, the rollers, such as 121, pivot with the control lever yoke 132 about the axle 152 against the friction of the friction nuts 156 and 158 against the slot 112.

The right and left wheel speed controls 138 and 140 each include a corresponding one of the right arms and left arms, 160 and 162 which are rotatably mounted to a control plate 136 for rotation therein. They each include corresponding ones of the roller surfaces 160A and 162A and rotatable members 160B and 162B. The rollers, such as the roller 121, rotate on the corresponding roller surfaces 160A and 162A to rotate the corresponding ones of the rotatable members 160B and 162B. The right and left rollers, one of which is shown at 121, roll on respective ones of the right and left roller surfaces 160A and 162A to rotate the arms 160 and 162, with the right roller (not shown) and the left roller 121 pivoting the arms as the control lever yoke 132 pivots to change the speed of the hydraulic pumps.

For this purpose, the control plate 136 is mounted to a stationary control panel 164 and rotatably mounts the arms 160 and 162 thereon. The right arm 160 is connected to a rotatable speed control lever 172 which is connected to a right speed control arm 174 for the right hydraulic pump to change the pumping rate as it rotates about the arm 160. The left arm 162 is similarly connected to change the pumping rate of the left hydraulic pump.

To independently change the pumping rate of one of the pumps, short linkages (the right hand short linkage being shown at 180) are mounted to different ones of the right and left rotatable speed control levers 172 and 182. For example, the linkage 180 is connected to the rotatable speed control lever 172 and to the right hand steering lever 20 (FIG. 1) to independently cause the speed control arm 174 to move in response to motion of the right hand steering lever 20 (FIG. 1) and thus cause right pump 54A (FIG. 2) to change its rate of pumping. Thus, rotation of the arm 160 changes the speed of the hydraulic pump on the right hand side. A similar short linkage, not shown in FIG. 5, operates in the same manner in cooperation with the left pump 54B (FIG. 2), the arm 162, the rotatable speed control lever 182, a short linkage (not shown) and the left hand steering lever 22 (FIG. 1).

With this arrangement, movement of the ground speed control lever 24 (FIG. 1) in the longitudinal plane causes simultaneous movement of both arms 160 and 162 to increase or decrease the speed of both hydraulic pumps 54A and 54B (FIG. 2) by substantially the same amount through contact of the right and left rollers on the ground speed control lever (the left roller 121 being shown in FIG. 5) with both right and left arms 160 and 162 in the same direction for the same amount. The arms 160 and 162 are spring biased upwardly against the rollers.

Figure 6:
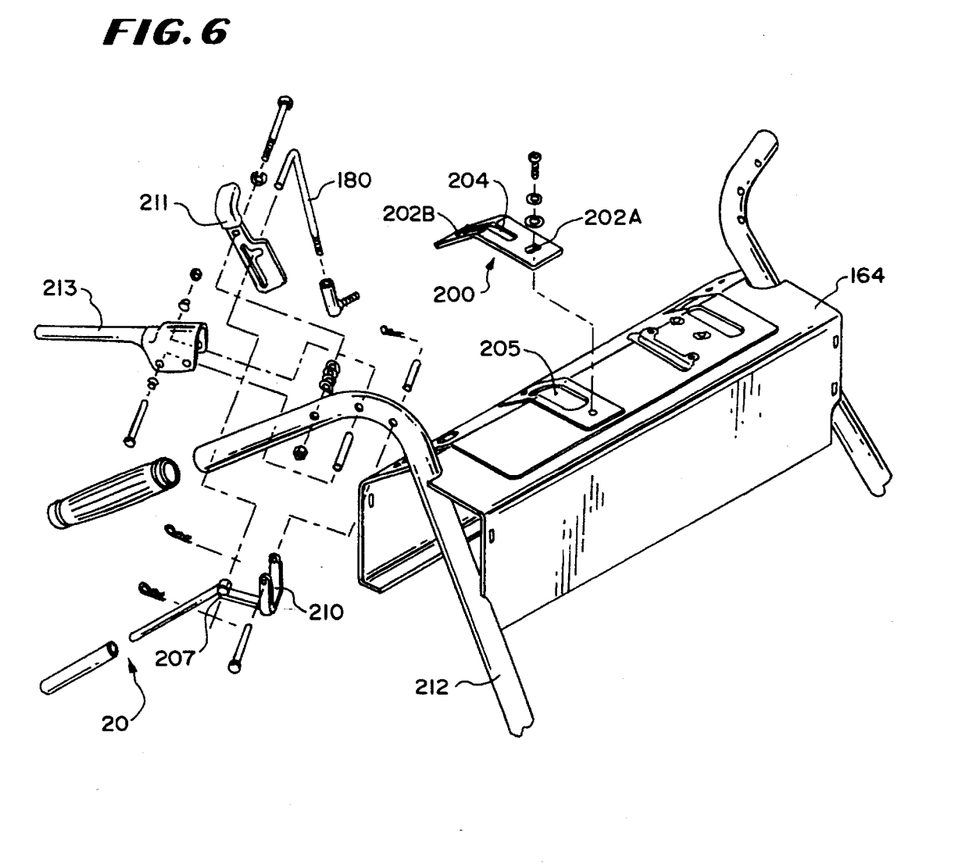
FIG. 6 is a simplified, fragmentary, partly exploded perspective view showing the individual hydraulic pump control means.

In FIG. 6 there is shown a simplified, fragmentary view of the stationary control panel 164, a ground-speed lever-control guide 200, front and rear slots 202A and 202B and a guide slot 204. The ground-speed lever-control guide 200 is mounted over a wide slot 205 in the control panel 164 with the guide slot 204 and wide slot 205 aligned with the longitudinal plane of the lawn mower. The ground speed control lever 24 (FIGS. 1 and 5) extends through guide slot 204 and wide slot 205 into the control panel to the control lever yoke 132 (FIG. 5). The wide slot 205 is narrowed near its bottom end where the ground speed control lever 24 (FIGS. 1 and 5) is in neutral and at this location, there is no transverse space in it so the ground speed control lever 24 cannot be moved transversly in neutral to cause creep on one side of the lawn mower.

The front and rear slots are on opposite sides of the the guide slot 204 and are mounted slidably by bolts to the control panel so that the guide 200 and guide slot 204 are movable from side to side within the range of the front and rear slots. The ground speed stick 130 is substantially the same width as the guide slot 204 but the left and right slots 202A and 202B and the wide slot 205 in the control panel are wide enough to permit movement in the transverse direction of the ground speed control lever as described above while restraining excessive movement.

As shown in this view, the right hand short linkage 180 is mounted to the right hand steering lever 20 (FIG. 1) at 207 near the operator presence lever 213 through slots in the thumblatch 211 to control the speed of the right hydraulic pump independently. This lever is connected through a yoke 210 to the steering handle 212 to be moved as the steering lever 20 is moved. The left short linkage (not shown is connected in a similar manner to the left hand steering lever 22 of FIG. 1) for the purpose of independantly controlling the speed of the left hydraulic pump.

In use, ground speed control lever 24 (FIGS. 1 and 5) increases the pumping rate of both hydraulic pumps 54A (FIGS. 2 and 5) and 54B (FIG. 2) or decreases their pumping rate substantially equally when it is moved along the longitudinal plane. When the ground speed lever 24 is moved at an angle to the longitudinal plane, it increases the pumping rate of one of the right and left hydraulic pumps 54A and 54B and decreases the pumping rate of the other, depending on whether the direction of movement is to the right or the left with respect to the longitudinal plane.

The amount of movement of the ground speed control lever 24 at an angle to the longitudinal plane is limited by the wide slot 205 near or at the pivot point of the speed control lever 24. The width of the wide slot 205 extends at an angle to the longitudinal plane of the lawn mower and has a length centered on the line of movement of the lever 24 within the longitudinal plane to permit an angular movement along the lateral slot that is within a preset range of angular movement. The range of the ratios of angular pivoting motion in the transverse direction to angular pivital motion in the longitudinal direction is between a ratio of 1 to 90 and a ratio of 1 to 3. Preferably, the angular motion in the transverse direction is between one degree and 1.3 degrees but should not be greater than 5 degrees. The angular motion may cause a reduction in the speed of one of the right and left wheels and an increase in the speed of the other of the right and left wheels approximately in the range of 2.5 to 5.5 percent.

The angular motion of the lever 24 is intended to permit a change of direction or turning of the lawn mower by changing the volumetric pump output to an amount within the range of 2 degrees of turning for 10 feet of forward motion to 10 degrees of turning of the lawn mower for 10 feet of forward motion. This control is intended to permit centering of the movement of the mower along the longitudinal plane using the speed lever 24 directly when the change in direction is caused by a difference in the speed characteristics of the right and left hydraulic pumps, hydraulic motors and linkages connecting them to each other and to the ground speed control lever.

To turn the lawn mower, the operator actuates the right speed control lever 20 that decreases the speed of the right wheel to cause the lawn mower to turn right and a left speed control lever 22 that decreases the speed of the left wheel to cause the lawn mower to turn left. After making a turn, the position of the ground speed control lever 24 provides an indication of the alignment of the lawn mower by its position. However, because the steering of the lawn mower is sensitive to the ground speed control lever, a correction is made slowly using the right and left steering control levers 20 and 22 while watching the direction of the mower for a precise indication of correction.

To provide the sensitive control, the ground speed control lever 24 is mounted to a pivotal yoke or gymbal having two degrees of freedom of motion. The movement of the control lever is limited to a predetermined angular motion along the longitudinal plane and to a much smaller angular motion in the transverse direction by the slots 204 and 205 (FIG. 6). When the lever 24 is pivoted along the longitudinal plane toward its front end, the speed of both hydraulic pumps is increased by substantially the same amount and when pulled backward along the longitudinal plane of the lawn mower, the speed is decreased. When pivoted to the right in a direction at an angle to the longitudinal plane, the pumping speed of the left hydraulic pump is decreased and the speed of the right hydraulic pump is increased. Similarly, when the speed control lever is pivoted at an angle to the longitudinal plane and to the left, the speed of the right hydraulic pump is decreased and the speed of the left hydraulic pump is increased.

The gymbal controls the speed of the wheels by pressing spring biased linkages 160A and 160B (FIG. 5) that control the pump volumetric output of the right and left hydraulic pumps 54A and 54B (FIG. 2). The range of motion of the pivoting is limited by a slot 205 (FIG. 6) in which the ground speed control lever moves. This slot may be narrowed to reduce the range by which speed differential between the wheels can be achieved by the ground speed control lever. For example, when the ground speed control lever is in neutral, the slot has the same width as the ground speed control lever so that neither pump can cause creep.

When correcting for drift or the tendency to turn when speed is increased, the roller such as 121 on the gymbal is rotated against the arms 160A or 162A depending on the transverse movement of the ground speed control lever 24. The gymbal is rotated about the pivot 190 in the collar 120 (FIG. 5) by the transverse movement of the ground speed control lever 24 to cause one roller to rotate one of the arms 160A or 162A downwardly with the other of the arms is biased upwardly to the other of the rollers.

From the above description, it can be understood that the hydraulically driven lawn mower of this invention has several advantages, such as for example: (1) it is relatively easy to correct for unintentional turning tendencies when the speed of the lawn mower is increased or decreased; and (2) the direction of turning is constrained to avoid the risk of an excessive overcorrection that could cause some damage.

Although a preferred embodiment has been described with some particularly, many modifications and variations may be made in the preferred embodiment without deviating from the invention. Therefore, it is to be understood that, within the scope of the appended claims, the invention may be practiced other than as specifically described.

What is claimed is:

1. A hydraulically driven lawn mower comprising:

frame means;

right and left drive wheels;

a primary power source;

cutter means for cutting turf;

said right and left drive wheels, primary power source and means for cutting turf being mounted to the frame means;

right and left hydraulic pumps;

right and left hydraulic motors each of which is connected to corresponding ones of the right and left drive wheels for driving the the corresponding drive wheels;

each of the right and left hydraulic motors being driven by a corresponding one of the right and left hydraulic pumps;

right and left hydraulic pump control means each being connected to a corresponding one of the right and left hydraulic pumps for changing the pumping rate of the corresponding right and left hydraulic pumps in proportion to the amount the corresponding one of the right and left hydraulic pump control means moves;

ground speed lever means for moving the right and left hydraulic pump control means by an equal amount in the same direction when moved in a longitudinal plane and for selectively moving one of the right and left pump control means differently than the other when moved in a plane other than the longitudinal plane;

a left speed lever for moving only the left hydraulic pump control means; and a right speed lever for moving only the right hydraulic pumup control means.

2. A hydraulically driven lawn mower according to claims 1 further including a guide means for permitting movement of the ground speed lever in a direction transverse to a longitudinal plane limited to an amount shorter in length than the distance the ground speed lever moves in the longitudinal plane.

3. A hydraulically driven lawn mower in accordance with claim 1 further comprising:

control panel means mounted to the control means;

said control planel means including means for indicating the amount of transverse movement of the ground speed lever from the longitudinal plate has occured, whereby the lawn mower may be adjusted in direction by one of the right and left speed levers.

4. A hydraulically driven lawn mower according to claim 2 in which the guide means includes means for permitting movement of the ground speed lever in a direction transverse to a longitudinal plane of between one degree and 1.3 degrees.

5. A hydraulically driven lawn mower according to claim 2 in which the guide means includes means for permitting movement of the ground speed lever in a direction transverse to a longitudinal plane of not greater than 5 degrees.

6. A hydraulically driven lawn mower according to claim 2 in which the guide means includes means for permitting movement of the ground speed lever in a direction transverse to a longitudinal plane limited to motion that may cause a reduction in the speed of one of the right and left wheels and an increase in the speed of the other of the right and left wheels approximately in the range of 2.5 to 5.5 percent.

7. A hydraulically driven lawn mower according to claim 2 in which the guide means includes means for permitting movement of the ground speed lever in a direction transverse to a longitudinal plane sufficient to permit a change of direction of the lawn mower by changing the speed of the pumping by an amount within the range of 2 degrees of turning for 10 feet of forward motion to 10 degrees of turning of the lawn mower for 10 feet of forward motion.

8. A method of operating a lawn mower comprising the steps of:

- changing the speed of the lawn mower in a forward direction along a longitudinal plane;
- correcting the speed by lateral movement of a control lever to increase the speed of one motor and decrease the speed of the other motor;
- momentarily applying a motor speed change to one of said right and left hydraulic motors while observing the control lever until the control lever is centered in the longitudinal plane, whereby the speed of the lawn mower will be aligned along the longitudinal plane.

9. A method of operating a lawn mower according to claim 8 wherein the guide means permits movement of the ground speed lever in a direction transverse to a longitudinal plane of between one degree and 1.3 degrees.

10. A method of operating a lawn mower according to claim 8 wherein the guide means permits movement of the ground speed lever in a direction transverse to a longitudinal plane of not greater than 5 degrees.

11. A method of operating a lawn mower according to claim 8 wherein the guide means permits movement of the ground speed lever in a direction transverse to a longitudinal plane limited to motion that may cause a reduction in the speed of one of the right and left wheels and an increase in the speed of the other of the right and left wheels approximately in the range of 2.5 to 5.5 percent.

12. A method of operating a lawn mower according to claim 8 wherein the guide means permits movement of the ground speed lever in a direction transverse to a longitudinal plane of sufficient to permit a change of direction of the lawn mower by changing the speed of the pumping by an amount within the range of 2 degrees of turning for 10 feet of forward motion to 10 degrees of turning of the lawn mower for 10 feet of forward motion.

* * * * *